Feb. 1, 1972  I. H. LEACH  3,639,551
CYCLIC METHOD FOR PRODUCING LOW-DENSITY POLYSTYRENE FOAM BEADS
Filed July 24, 1969
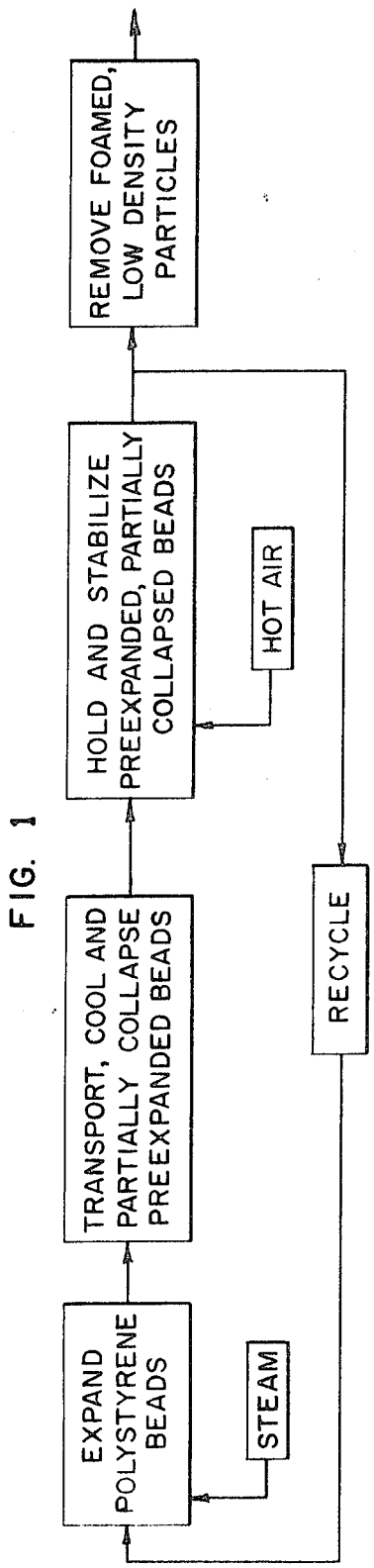
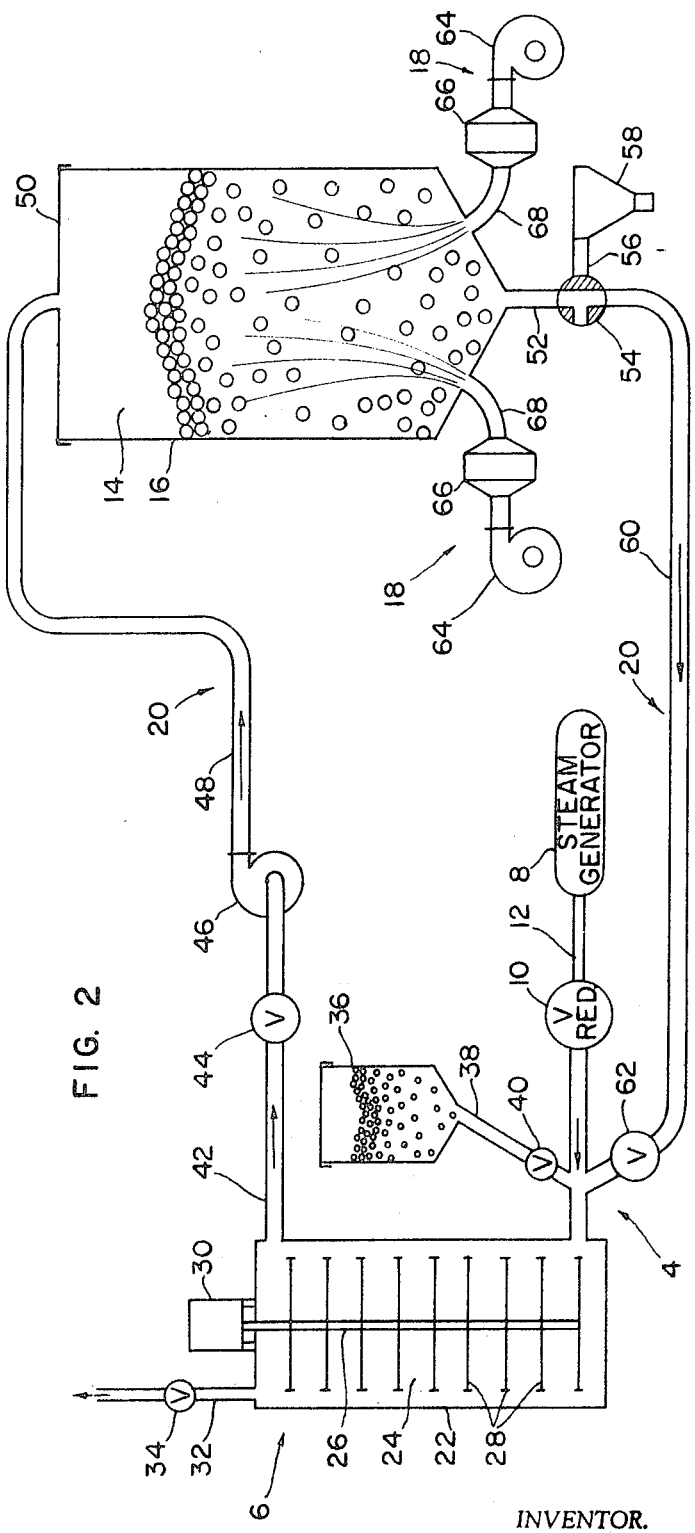
INVENTOR.
IRBY H. LEACH
BY
Townsend and Townsend
ATTORNEYS

United States Patent Office 3,639,551
Patented Feb. 1, 1972

3,639,551
CYCLIC METHOD FOR PRODUCING LOW-DENSITY POLYSTYRENE FOAM BEADS
Irby H. Leach, 2094 Emerson, Napa, Calif. 94558
Filed July 24, 1969, Ser. No. 844,344
Int. Cl. B29d 27/00
U.S. Cl. 264—55                                   5 Claims

ABSTRACT OF THE DISCLOSURE

Polystyrene beads are subjected to heated water vapor to partially expand the beads and they are thereafter transported to a holding chamber. During transportation, a partial collapse of the pre-expanded beads takes place. In the chamber the beads are subjected to heated air to stabilize their volume. From the holding chamber the pre-expanded beads are recycled a plurality of times until the beads have a density of about 0.5 pounds per cubic foot or less. The temperature of the water vapor is raised during each successive cycle.

BACKGROUND OF THE INVENTION

Expanded or foamed polystyrene particles are presently in wide use for a large variety of products such as containers, insulation boards, flotation devices, shock absorbing packaging and the like. Among the many well known desirable characteristics of foamed polystyrene is its low density which, in the past, has ranged down to about 0.5 pound per cubic foot.

Presently a large proportion of foamed polystyrene is molded into products of various shapes and sizes. To a lesser degree styrene beads are foamed into individual, expanded beads or particles which are subsequently used for various applications such as their inclusion in building materials to reduce the weight of such materials. In those instances it is often desirable to have foamed styrene particles of a minimal density.

Until now no economical process has been found for expanding the polystyrene beads in one step into foamed particles of the desired low density. Generally speaking, in the prior art the expansion of polystyrene beads was carried out in several steps or cycles. In the first cycle the beads are subjected to heat to expand them to a point at which the expanded bead volume is at a maximum and the bead retains its volumetric stability, that is it will not collapse. The original expansion of the polystyrene beads is the result of a blowing agent or propellant, usually pentane (a low-boiling hydrocarbon), which expands and foams the bead.

During the foaming operation the propellant forms enclosed cells within the bead and thereby expands the bead. The propellant penetrates the polystyrene at a high rate and escapes rapidly. The cooling of the beads causes a vacuum in the cells which can collapse the pre-expanded beads unless it is controlled by limiting the expansion of the bead. While the pre-expanded beads are stored, air, which has a low penetration rate through the cell walls, slowly enters the vacuumized bead cells until the pressure in the cells has been brought into equilibrium with the surrounding atmosphere. This takes about 24 to 36 hours. Thereafter the beads are recycled.

There is a danger that physical shock or vibration collapses the beads after they were heated even though the bead expansion is controlled. Consequently, the beads must be carefully insulated from shock and vibration which further burdens the process.

In the recycling step air entrapped in the cells and any residual propellant act as a blowing agent continuing the expansion of the beads. The cooling and holding steps are repeated to bring the interior bead cells back into equilibrium and the beads are again recycled until the desired density of the beads has been reached.

It is apparent that the processing of beads in accordance with the prior art is very time-consuming. Usually at least 3 and often 4 or more cycles are required to obtain the finish foamed bead. This requires at least 72 hours and often as much as 100 hours or more. The large increase in the bead volume of up to 50 times and more of its original size creates formidable problems since large storage spaces are required and cannot otherwise be utilized during the processing of the beads. Manufacturing costs thereby increase significantly.

Furthermore, as a direct result of the increasing costs for obtaining foamed polystyrene particles of lower densities, the lowest density of foamed polystyrene particles available on a commercial scale has been about 0.5 pound per cubic foot. Although lower density particles are desirable the high cost of prior art production methods prevented their availability.

SUMMARY OF THE INVENTION

The present invention provides an economical process for the manufacture of foamed polystyrene having densities of as low as 0.5 pound per cubic foot and less. As in the prior art the polystyrene beads are cycled several times but, in distinction to the prior art, at a cycle frequency of about one per hour. The total processing time for obtaining the desired low density is no more than four to five hours as compared to 72 to 100 or more hours in prior art processes. This enables a much higher turnover, allows a significant reduction in required storage space and further yields higher quality foamed polystyrene beads while reducing the manufacturing costs.

Briefly, the process comprises the steps of subjecting the polystyrene beads to water vapor under time-temperature conditions carrying the expansion past an optimal, stable volume to form volumetrically unstable, excessively expanded beads. Thereafter the beads are transported to a holding chamber. As a result of the volumetric instability of the expanded beads they partially collapse during their transport. In the chamber the beads are subjected to hot air increasing the bead volume somewhat and stabilizing their volume and density. Thereafter the beads are recycled to repeat the above steps and thereby lower the density of the beads.

Each time the beads are re-introduced into the water vapor the pressure thereof is increased by about five to about twenty-five pounds per square inch (p.s.i.) to obtain what is believed a necessary temperature rise of the vapor of between about 10 to about 30 degrees F. during each succeeding cycle.

In the presently preferred form of this invention a predetermined quantity of polystyrene beads, say about 1,000 pounds, is continuously introduced into the water vapor and is there pre-expanded. The pre-expanded beads are transported into the holding chamber and are retained therein until all beads have been pre-expanded. This requires about one hour during which time the beads in the holding area are subjected to hot air, preferably at a temperature of between about 160 to 180 degrees F. although that temperature may range from about 140 to about 190 degrees F. Thereafter the beads are withdrawn from the chamber and recycled, thus resulting in an average cycle time of about one hour. It is believed that substantially shorter holding periods are possible if the manufacturing setup makes that desirable.

Aside from the already mentioned time and cost savings afforded by the process of the present invention over prior art polystyrene expansion processes, the present invention does not require a vibrationless cooling of the pre-expanded particles since a collapse of the particles need not be prevented. As compared to prior art processes the present process is thereby significantly simplified.

BRIEF DESCRIPTION OF THE DRAWINGS

The objects, features and advantages of the present invention will be more apparent after referring to the following specification and accompanying drawings in which:

FIG. 1 is a schematic flow diagram illustrating the steps of the present invention; and FIG. 2 is a schematic diagram of an apparatus for expanding polystyrene in accordance with the present invention.

DESCRIPTION OF THE PREFERRED EMBODIMENTS

Referring to FIG. 2, an apparatus 4 for practicing the process of the present invention generally comprises a continuous steam expander 6, a steam generator 8 communicating with the interior of the expander via a conduit 12 entering the expander at a bottom thereof and a reduction valve 10 in the conduit. The apparatus further includes a holding chamber 14 defined by a tank 16, a hot air blowing mechanism 18 for the holding chamber and transport conduits 20 between the steam expander and the holding chamber.

The steam expander is of a conventional construction and readily available on the market. Its description is therefore limited to those portions necessary for an understanding of the present invention. The expander has a vessel 22 defining an expansion chamber 24 and having provisions to fluidly connect the chamber with steam inlet conduit 12 and transport conduits 20. An agitator 26 is mounted for rotating radial arms 28 within chamber 24 and is driven by an electric motor 30 via a reduction gear (not shown). The steam expander also includes a vent 32 closable by a valve 34. A hopper 36 terminates in a conduit 38 closable by a valve 40 and communicates the hopper with steam line 12.

An exhaust conduit 42 communicates an upper end of the expansion chamber via a valve 44 with the suction side of a conventional air blower 46. The pressure side of the air blower is connected to a conduit 48 terminating at top 50 of tank 16.

A withdrawal tube 52 connects the bottom of tank 16 with a three-way valve 54. A first conduit 56 from the three-way valve leads to a discharge funnel 58 for packaging of finish foamed beads. A second conduit 60 extends from the three-way valve via a shut-off valve 62 to steam pressure conduit 12 leading into expansion chamber 24.

Tank 16 is also connected to a plurality of hot air blowing mechanisms 18 to evenly heat the holding chamber 14. Each hot air blowing mechanism comprises an air blower 64 forcing air through a heat exchanger 66 and past a conduit 68 into the holding chamber. The blowing mechanism may include thermostats, temperature controls, etc., all known per se, and it is sized such that the temperature in the holding chamber can be regulated within a range from about 140 degrees to about 190 degrees F.

Turning now generally to the process of expanding polystyrene beads into foamed particles in accordance with the present invention, and referring to FIGS. 1 and 2, a quantity of beads is first placed in hopper 36. Reduction valve 10 is set to yield, at its downstream side, steam of the appropriate pressure (whereby the temperature of the steam is also controlled) to fill expansion chamber 24 with hot steam and raise its pressure and temperature to the desired level. Metering valve 40 is opened to communicate the interior of hopper 36 with the steam stream entering the expansion chamber. In the expansion chamber the elevated temperature from the steam causes the propellant in the polystyrene beads to become active and expand the beads. Agitator 26 prevents the conglomeration of the expanding beads in chamber 24. Upon the filling of the expansion chamber with beads the suction applied by blower 46 withdraws them through conduit 42 and past valve 44. They are then pneumatically transported into holding chamber 14.

Blowing mechanism 18 maintains the temperature in the holding chamber at between about 140 degrees to about 190 degrees F. As has already been briefly mentioned the pre-expanded polystyrene beads being removed from the expansion chamber collapse during their transportation to the holding tank; that is, their volume decreases. In the heated atmosphere of the holding chamber the pre-expanded polystyrene beads experience a partial recovery of the volume lost during their transportation from the expansion chamber. After that partial pre-expansion has taken place, which generally requires no more than a few minutes, and after the unexpanded bead supply in hopper 36 has been exhausted, metering valve 40 is closed and three-way valve 54 and valve 62 are opened to communicate the holding chamber with steam conduit 12. The stabilized, pre-expanded polystyrene beads are now recycled into the expander for additional expansion of the beads to lower their density.

To accomplish the additional bead expansion reduction valve 10 is adjusted to increase the steam pressure in expansion chamber 24 during each succeeding expansion cycle by between about 3 to about 25 p.s.i. This causes a corresponding temperature increase in the expansion chamber of between about 5 to about 30 degrees F. (allowing for certain steam temperature losses not separately calculated or measured). Applicant believes that this temperature increase is necessary to enable the further expansion of stabilized, pre-expanded polystyrene beads although it is possible that the pressure increase, or a combination of the temperature and pressure increase is responsible to enable the further expansion.

After their introduction in chamber 24 the process continues as described above. The beads are further expanded, partially collapse again during their return to holding chamber 14 and they are there stabilized with a partial recovery of their volume. The beads are recycled as many times as necessary to obtain the desired density of the expanded beads, each cycle further decreasing such density. For polystyrene compounds and a desired density of 0.5 pound per cubic foot or less it is usually sufficient to recycle the beads twice or thrice.

The invention is further illustrated by the following example of an actual production run.

EXAMPLE 1000 pounds of a commercial grade acrylonitrile styrene copolymer beads having a low boiling hydrocarbon propellant (pentane) included therein and a diameter between about $\frac{1}{64}$ to about $\frac{1}{32}$ inch were stored in a hopper and fed into a "Buccaneer" pre-expander (available from the TRI Manufacturing & Sales Co., Lebanon, Ohio) having an expansion chamber substantially as described above. In the expansion chamber saturated steam of an absolute pressure of about 15 p.s.i. was present. The temperature in the expansion chamber was calculated to have been between about 212 to about 220 degrees F.

The agitator of the expander was set into operation to prevent the high temperature beads from conglomerating. The average retention time of the beads in the expansion chamber was about 2 minutes which, under the temperature and/or pressure conditions were such that the acrylonitrile styrene beads expanded beyond their stable volume or density. Removal of the pre-expanded beads and their transportation to the holding chamber caused a partial reduction of their volumes.

The collapse of the overexpanded beads appears to be at least partially a result of the rapid dissipation of the low boiling hydrocarbon propellant from the interior bead cells, thereby leaving a partial vacuum in the cells. During the retention of the collapsed beads in the holding chamber, hot air appeared to have entered the cells to equilibrize the pressure therein which in turn reconstituted a part of the lost bead volume. At that point the bead volume became stable and they could be recycled.

The holding tank was insulated and included hot air blowers which maintained the temperature in the holding chamber at between 160 to 180 degrees F. The holding chamber has a sufficient volume to receive the 1,000 pounds of pre-expanded beads. The processing of that quantity through the Buccaneer pre-expander took about one hour which automatically became the retention time for the beads in the holding chamber. After all beads had been pre-expanded they were recycled.

Upon introduction of the pre-expanded, stabilized beads in the expansion chamber the steam pressure therein was increased to about 35 p.s.i. resulting in a corresponding steam temperature of about 232° F. The beads were retained in the chamber a sufficient length of time to expand them to their unstable state and subject them to a partial volume reduction during their transportation to the holding chamber. In the holding chamber the further expanded beads were again subjected to a temperature of about 160 to 180 degrees F. for a period of one hour.

The beads were recycled two more times (for a total of 4 cycles) and the steam pressure was increased by 20 p.s.i. during each succeeding cycle to obtain corresponding temperature increases in the expansion chamber up to a maximum temperature of about 270° F.

After the last cycle the expanded beads were again retained in the holding chamber for about one half hour and they were then discharged into bags for transportation to their point of use.

The fully expanded beads had a density of 0.2 pound per cubic foot and a resilient, rubber-like consistency which prevented any noticeable crushing or volume reduction of the beads during storage and subsequent use. The beads are closed cell beads and exhibit practically no water absorbency. They were obtained in a process in which the beads were recycled four times and which lasted a total of approximately five hours.

While one embodiment of the invention has been shown and described, it will be obvious that other adaptations and modifications can be made without departing from the true spirit and scope of the invention.

I claim:

1. A process for expanding polystyrene beads into low density foamed beads comprising the steps of: exposing the beads to a heated medium including water vapor having a temperature of at least about 190° F. to partially expand the beads without destructing the bead and bead material, holding heated partially expanded beads in an inert atmosphere, subjecting the partially expanded beads to a heated air of a temperature between about 140° F. and about 190° F., thereafter recycling the partially expanded beads at intervals no more than about one hour by repeating the enumerated steps to obtain the foamed beads, and increasing the temperaure of the water vapor during each successive cycle by at least about 5° F.

2. A process for expanding polystyrene beads including a blowing agent into low-density foam comprising the steps of heating the beads with water vapor to a temperature of between about 190° F. to about 270° F. and subjecting the beads to sufficient pressure to cause a pre-expansion of the beads, transporting the pre-expanded beads to a holding chamber while permitting the beads to partially collapse, subjecting the pre-expanded beads in the holding chamber to hot air of between about 140° F. and about 190° F., withdrawing partially expanded beads from the chamber, recycling the partially expanded beads at least about once an hour a plurality of times to finish expand the beads to a density of between about 0.2 to about 0.5 pound per cubic foot, and increasing the water vapor pressure by between about 5 to about 25 pounds per square inch during each succeeding cycle.

3. A process for forming low density expanded polystyrene particles from polystyrene beads including a blowing agent comprising the steps of:
   (a) agitating the beads in a first chamber,
   (b) introducing pressurized water vapor having a temperature of between about 190 to about 270 degrees F. into the first chamber to pre-expand the beads under time-temperature conditions rendering the pre-expanded beads volumetrically unstable,
   (c) pneumatically transporting the pre-expanded beads from the first to a second chamber whereby the volumetric instability of the pre-expanded beads causes their partial collapse,
   (d) maintaining the pre-expanded beads in the second chamber in heated air of a temperature between about 140° F. and about 190° F. to thereby volumetrically stabilize the pre-expanded, partially collapsed beads,
   (e) transporting the pre-expanded beads from the second chamber to the first chamber,
   (f) recycling the pre-expanded beads through steps (a) through (e) at intervals not exceeding about one hour,
   (g) increasing the water vapor pressure and temperature in the first chamber by at least about 3 pounds per square inch and at least about 5° F., respectively, during each succeeding recycling of the beads through step (a); and
   (h) collecting the finish expanded particles by removing such particles from the second chamber after the completion of the last step (h).

4. A process for expanding polystyrene beads including a blowing agent into low-density foam particles comprising the steps of: (a) heating the beads with water vapor to pre-expand the beads and (b) transporting the pre-expanded beads to a holding chamber, steps (a) and (b) being carried out under time-temperature conditions carrying the expansion of the polystyrene beads past a point of volumetric stability of the beads to thereby cause a partial collapse of the pre-expanded beads after the heating of the beads, (c) heating the pre-expanded beads in the holding chamber to between about 140° F. to about 190° F., and (d) recycling the pre-expanded beads from the holding chamber at controlled time conditions to limit the overall duration of the process to no more than about 5 hours a plurality of times to repeat steps (a) through (c) until the density of the expanded beads in the holding chamber is less than about 0.5 pound per cubic foot, the recycling step including the step of increasing the water vapor temperature and pressure for each succeeding cycle.

5. A process according to claim 4 wherein step (c) comprises the steps of bringing the beads to and maintaining the beads at a temperature of between about 160 to about 180 degrees F.

References Cited

UNITED STATES PATENTS

| | | | |
|---|---|---|---|
| 3,056,753 | 10/1962 | Fronko | 264—55 X |
| 3,126,432 | 3/1964 | Schuur | 264—53 |
| 3,188,264 | 6/1965 | Holden | 264—51 X |
| 3,207,820 | 9/1965 | Scarvelis | 264—53 |
| 3,264,381 | 8/1966 | Stevens | 264—55 X |
| 3,347,961 | 10/1967 | Russell | 264—53 |

FOREIGN PATENTS

| | | | |
|---|---|---|---|
| 591,621 | 1/1960 | Canada | 264—55 |
| 1,440,075 | 4/1965 | France | 264—53 |

JULIUS FROME, Primary Examiner

P. A. LEIPOLD, Assistant Examiner

U.S. Cl. X.R.

263—21 B; 264—53